(12) United States Patent
Huang

(10) Patent No.: US 7,321,467 B2
(45) Date of Patent: Jan. 22, 2008

(54) ANTI-REFLECTION COATING LAYER AND DESIGN METHOD THEREOF

(75) Inventor: Chun-Chung Huang, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 223 days.

(21) Appl. No.: 10/908,783

(22) Filed: May 26, 2005

(65) Prior Publication Data
US 2006/0268415 A1   Nov. 30, 2006

(51) Int. Cl.
*G02B 1/10* (2006.01)
(52) U.S. Cl. .............................. 359/586; 359/589
(58) Field of Classification Search .......... 359/580, 359/586, 589; 438/636
See application file for complete search history.

(56) References Cited

U.S. PATENT DOCUMENTS

| | | | |
|---|---|---|---|
| 6,218,292 B1 * | 4/2001 | Foote | 438/636 |
| 6,331,379 B1 | 12/2001 | Ireland et al. | 430/314 |
| 6,423,474 B1 | 7/2002 | Holscher | 430/312 |
| 6,479,401 B1 * | 11/2002 | Linliu et al. | 438/763 |
| 6,562,544 B1 | 5/2003 | Cheung et al. | 430/313 |
| 6,664,177 B1 * | 12/2003 | Lin et al. | 438/624 |
| 6,800,566 B2 | 10/2004 | Lu et al. | 438/761 |
| 7,070,911 B1 * | 7/2006 | Hopper et al. | 430/313 |
| 2002/0097493 A1 * | 7/2002 | Li et al. | 359/589 |
| 2003/0040179 A1 * | 2/2003 | Thakar et al. | 438/689 |
| 2004/0214446 A1 * | 10/2004 | Kim et al. | 438/706 |
| 2006/0051964 A1 * | 3/2006 | Xia et al. | 438/706 |

* cited by examiner

Primary Examiner—Leonidas Boutsikaris
(74) Attorney, Agent, or Firm—Jianq Chyun IP Office

(57) ABSTRACT

An anti-reflection coating layer is formed between an under layer and a photoresist layer. The anti-reflection coating is characterized in a refraction value (n) of the anti-reflection coating layer, wherein n is a constant, and an extinction coefficient (k) of the anti-reflection coating layer, increasing in gradient toward the under layer. Thus, the substrate reflectivity with respect to different under layers can be substantially equal to 0 by controlling the k of the anti-reflection coating layer.

17 Claims, 5 Drawing Sheets

ANTI-REFLECTION COATING LAYER AND DESIGN METHOD THEREOF

BACKGROUND OF THE INVENTION

1. Field of the Invention

The present invention relates to an anti-reflection coating (ARC) layer and a design method thereof. More particularly, it relates to an anti-reflection coating layer with a substrate reflectivity substantially equal to zero, and a design method thereof.

2. Description of the Related Art

As line width is reduced in semiconductor manufacturing process, it is more difficult to perform a photolithographic process. With the shrinkage of line width, misalignments easily occur. Especially during an exposure process, due to the interference of light reflected from under layers and the substrate under a photoresist layer, the photoresist patterns defined may be distorted or deviate, leading to incorrect transfers of the photolithographic pattern.

In order to prevent the misalignment, an anti-reflection coating layer usually is formed under the photoresist layer to reduce the substrate reflectivity. FIG. 1 is a schematic cross-sectional view of an anti-reflection coating layer in a semiconductor of the prior art.

In FIG. 1, the under layer 102 is formed over the substrate 100. The anti-reflection coating layer 104 is then formed over the under layer 102, wherein the anti-reflection coating layer 104 has a refraction constant (n), an extinction coefficient (k) and a thickness. The photoresist layer 106 is then formed over the anti-reflection coating layer 104 in order to perform the exposure process. When the exposure light source 110 is incident to the photoresist layer 106 and reaches the anti-reflection coating layer 104, the anti-reflection coating layer 104 reduces the light incident to the substrate 100. Thus, the substrate reflectivity can be reduced.

The values of n, k and thickness of the anti-reflection coating layer must be adjusted according to the materials used in the under layer 102 and the substrate 100 in order to optimize the anti-reflection of different under layers 102. That is, great efforts must be taken to optimize the n, k and thickness values of the anti-reflection coating layer. Therefore, an all-purpose anti-reflection coating layer applicable to different under layers and a design method thereof are desired.

SUMMARY OF THE INVENTION

Accordingly, at least one object of the present invention is to provide an all-purpose anti-reflection coating layer applicable to different under layers so that the substrate reflectivity is substantially equal to 0.

At least a second objective of the present invention is to provide a method of designing an anti-reflection coating layer to simplify the interaction among the values of refraction (n), extinction coefficient (k) and thickness of the anti-reflection coating layer so that the substrate reflectivity is substantially equal to 0.

The present invention provides an anti-reflection coating layer suitable to be formed between an under layer and a photoresist layer. The anti-reflection coating layer is characterized in a refraction value (n) of the anti-reflection coating layer, wherein n is a constant, and an extinction coefficient (k) of the anti-reflection coating layer, wherein k increases in gradient form from the top down.

According to the anti-reflection coating layer of one embodiment of the present invention, the increment of the value k of the anti-reflection coating layer is larger than 0 and smaller than 2. In addition, the value k of the anti-reflection coating layer is increased in gradient from the top set as 0 toward the under layer. The number of times the value k is increased in gradient from the top down is at least 2. Each layer with a different k in the anti-reflection coating layer has a different thickness. The thickness of each layer with a different k in the anti-reflection coating layer is gradually increased from the top down.

According to the embodiment of the present invention, the thickness of the aforementioned anti-reflection coating layer is a constant.

According to the embodiment of the present invention, the n of the aforementioned anti-reflection coating layer is larger than the n of the photoresist layer. For example, the n of the anti-reflection coating layer is larger than 1.8.

The present invention also provides a method of designing an anti-reflection coating layer. The method substantially reduces the substrate reflectivity of the anti-reflection coating layer to nearly zero. The method of designing the anti-reflection coating layer comprises an anti-reflection coating layer formed between an under layer and a photoresist layer. The n of the anti-reflection layer is a constant, and the k of the anti-reflection layer is increased in gradient toward the under layer.

According to the method of designing the anti-reflection coating layer in the embodiment of the present invention, the increment of the value k of the anti-reflection coating layer is larger than 0 and smaller than 2. In addition, the k of the anti-reflection coating layer is increased in gradient from the top set as 0 toward the under layer. The number of times the k of the anti-reflection coating layer is increased in gradient toward the under layer is at least 2. Each layer with a different k in the anti-reflection coating layer has a different thickness which is gradually increased toward the under layer.

According to the method of designing the anti-reflection coating layer in the embodiment of the present invention, the thickness of the anti-reflection coating layer is a constant.

According to the method of designing the anti-reflection coating layer in the embodiment of the present invention, the n of the anti-reflection coating layer is larger than the n of the photoresist layer. For example, the n of the anti-reflection coating layer is larger than 1.8.

According to the method of designing the anti-reflection coating layer in the embodiment of the present invention, the under layer comprises a silicon oxide layer, a silicon nitride layer, a polysilicon layer, a metal layer or a silicon substrate, for example.

According to the present invention, the n of the anti-reflection coating layer is a constant, and the k of the anti-reflection coating layer is increased in gradient toward the under layer. Unlike the n, k and thickness of the anti-reflection coating layer in prior art, which need to be manipulated in a sophisticated manner, the present invention can easily attain a substrate reflectivity substantially equal to zero in different under layers. Moreover, if the thickness of the anti-reflection coating layer of the present invention is large enough, it can serve as a hard mask (HM).

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
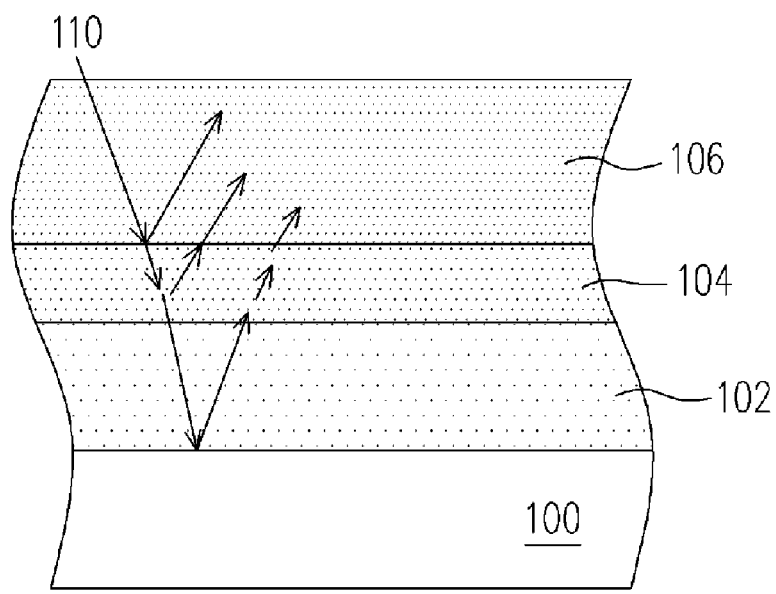
FIG. 1 is a schematic cross-sectional view of an anti-reflection coating layer in a semiconductor of prior art.
Figure 2:
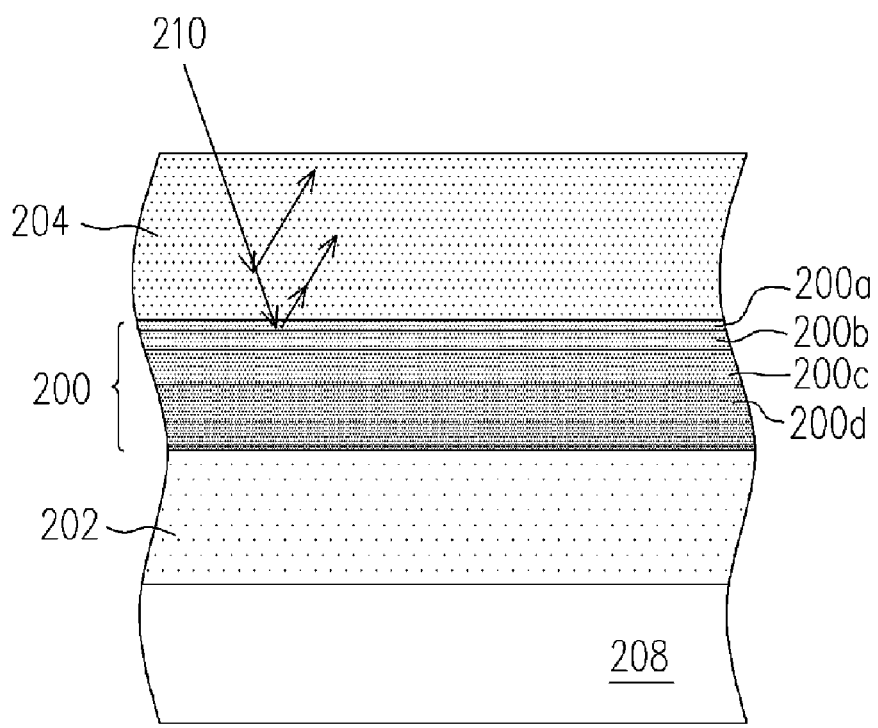
FIG. 2 is a schematic cross-sectional view showing an anti-reflection coating layer in a semiconductor structure according to one embodiment of the present invention.

FIG. 2 is a schematic cross-sectional view showing an anti-reflection coating layer in a semiconductor according to one embodiment of the present invention. As shown in FIG. 2, the anti-reflection coating layer 200 according to this embodiment is formed between an under layer 202 and a photoresist layer 204. Moreover, the refraction value (n) of the anti-reflection coating layer 200 is a constant, and its extinction coefficient (k) is increased in gradient toward the under layer 202. In this embodiment, the increment of the value k anti-reflection coating layer 200 is larger than 0 and smaller than 2, for example. When the anti-reflection coating layer 200 comprises four layers 200a-200d as shown in FIG. 1, the difference of k between the lower layer and the upper layer in two adjacent layers of the layers 200a-200d is larger than 0 and smaller than 2. Note that in a conventional technology, the k of the layers 200a-200d can be adjusted by modifying process factors in the same process. Moreover, the k of the anti-reflection coating layer 200 is increased from the top set as 0 toward the under layer 202. According to this embodiment, it is preferred that the k of the layer 200a in the anti-reflection coating layer 200 is 0. In addition, the number of times the k of the anti-reflection coating layer 200 is increased in gradient toward the under layer 202 is at least 2, for example.

In FIG. 2, in the anti-reflection layer 200, each thickness of the layers 200a-200d varies with a different k, for example. It is preferred that the thickness of each of the layers 200a-200d with a different k is gradually increased toward the under layer 202. In addition, the thickness of the anti-reflection coating layer 200 of this embodiment can be, for example, a constant, depending on the conditions of the actual semiconductor manufacturing process. The n of the anti-reflection coating layer 200 can be larger than that of the photoresist layer 204. For example, the n of the photoresist layer 204 is about 1.8, and the n of the anti-reflection coating layer 200 should be larger than 1.8.

In FIG. 2, the exposure light source 210 is incident to the photoresist layer 204 and reaches the anti-reflection coating layer 200. The exposure light source 210 is gradually weakened as passing through the anti-reflection coating layer 200 with k increasing toward the under layer 202. As a result, the exposure light source 210 cannot be reflected from the under layer 202, let alone reaching the substrate 208. Accordingly, the anti-reflection coating layer 200 of this embodiment enables the substrate reflectivity is substantially equal to 0.

Figure 3:
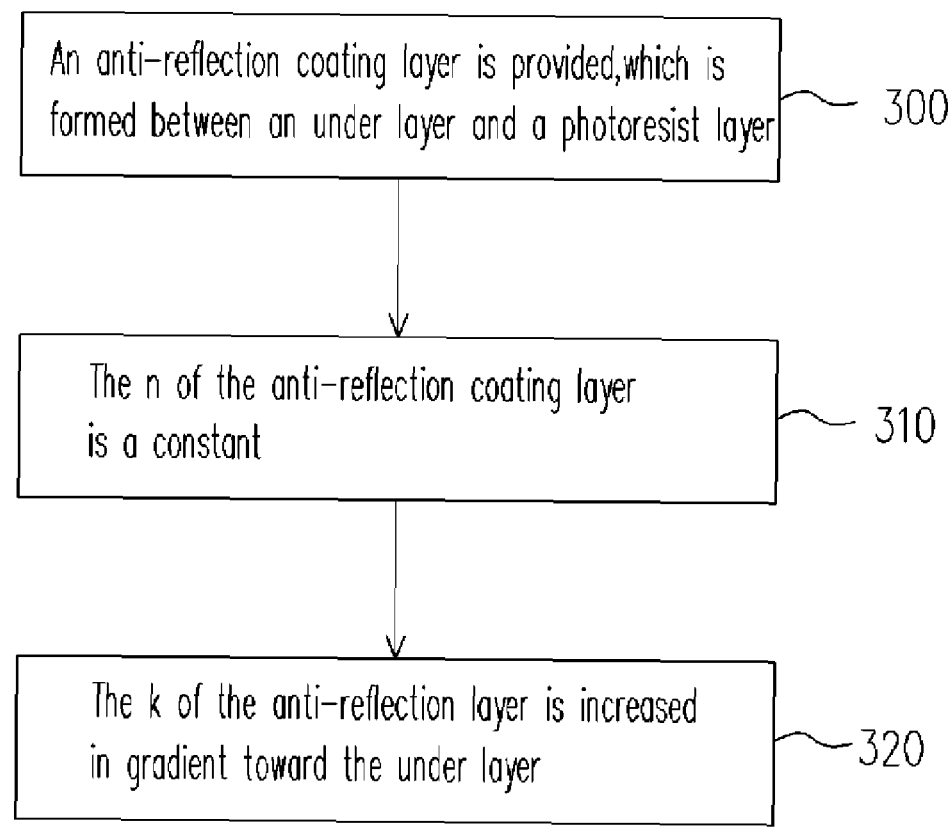
FIG. 3 is a drawing of a flowchart showing the procedure of the method of designing the anti-reflection coating layer according to one embodiment of the present invention.

The present invention also provides a method of designing an anti-reflection coating layer. FIG. 3 is a drawing of a flowchart showing a method of designing an anti-reflection coating layer according to one embodiment of the present invention. In FIG. 3, an anti-reflection coating layer is provided in Step 300. The anti-reflection coating layer is formed between an under layer and a photoresist layer, wherein the under layer can be a material layer applied to various semiconductor devices, such as a silicon oxide layer, a silicon nitride layer, a polysilicon layer, a metal layer or a silicon substrate.

In Step 310, the n of the anti-reflection coating layer is a constant, which can be larger than the n of the aforementioned photoresist layer. The n of the anti-reflection coating layer can be larger than 1.8, for example.

In Step 320, the k of the anti-reflection coating layer is increased in gradient toward the under layer, wherein, the k of the anti-reflection coating layer can be larger than 0 and smaller than 2, for example. The k of the anti-reflection coating layer is increased from the top set as 0 toward the under layer. The number of times the k of the anti-reflection coating layer is increased in gradient toward the under layer can be at least 2, for example. Moreover, each thickness of the layers with different k within the anti-reflection coating layer can be different, and can be increased toward the under layer, for example. In addition, the thickness of the anti-reflection coating layer can be a constant according to the present method, for example.

Additionally, if the thickness of the anti-reflection coating layer is large enough, the layer serves not only for anti-reflection, but also as a hard mask. The design method is similar to that described above. Detailed descriptions are not repeated.

To demonstrate the performance of the present invention, the following are experimental data and simulations. Tables 1-4 show experimental conditions of the anti-reflection coating layer with four different under layers according to the present invention, wherein the n and k of each material are shown in brackets.

TABLE 1

| | Layer Material | Thickness (nm) |
|---|---|---|
| 1 | Photoresist layer | 300 |
| 2 | Anti-reflection coating layer (n = 2.0, k = 0.0) | 10 |
| 3 | Anti-reflection coating layer (n = 2.0, k = 0.5) | 30 |
| 4 | Anti-reflection coating layer (n = 2.0, k = 1.5) | 60 |
| 5 | Silicon substrate (n = 1.57, k = 3.57) | — |

TABLE 2

| | Layer Material | Thickness (nm) |
|---|---|---|
| 1 | Photoresist layer | 300 |
| 2 | Anti-reflection coating layer (n = 2.0, k = 0.0) | 10 |
| 3 | Anti-reflection coating layer (n = 2.0, k = 0.5) | 30 |
| 4 | Anti-reflection coating layer (n = 2.0, k = 1.5) | 60 |
| 5 | Polysilicon layer (n = 1.69, k = 2.76) | 120 |
| 6 | Silicon substrate (n = 1.57, k = 3.57) | — |

TABLE 3

| Layer | Material | Thickness (nm) |
| --- | --- | --- |
| 1 | Photoresist layer | 300 |
| 2 | Anti-reflection coating layer (n = 2.0, k = 0.0) | 10 |
| 3 | Anti-reflection coating layer (n = 2.0, k = 0.5) | 30 |
| 4 | Anti-reflection coating layer (n = 2.0, k = 1.5) | 60 |
| 5 | BPSG (n = 1.52, k = 0) | 900 |
| 6 | Silicon substrate (n = 1.57, k = 3.57) | — |

TABLE 4

| Layer | Material | Thickness (nm) |
| --- | --- | --- |
| 1 | Photoresist layer | 300 |
| 2 | Anti-reflection coating layer (n = 2.0, k = 0.0) | 10 |
| 3 | Anti-reflection coating layer (n = 2.0, k = 0.5) | 30 |
| 4 | Anti-reflection coating layer (n = 2.0, k = 1.5) | 60 |
| 5 | AlCu (n = 1.9, k = 2.94) | 350 |
| 6 | Silicon substrate (n = 1.57, k = 3.57) | — |

Figure 4A:
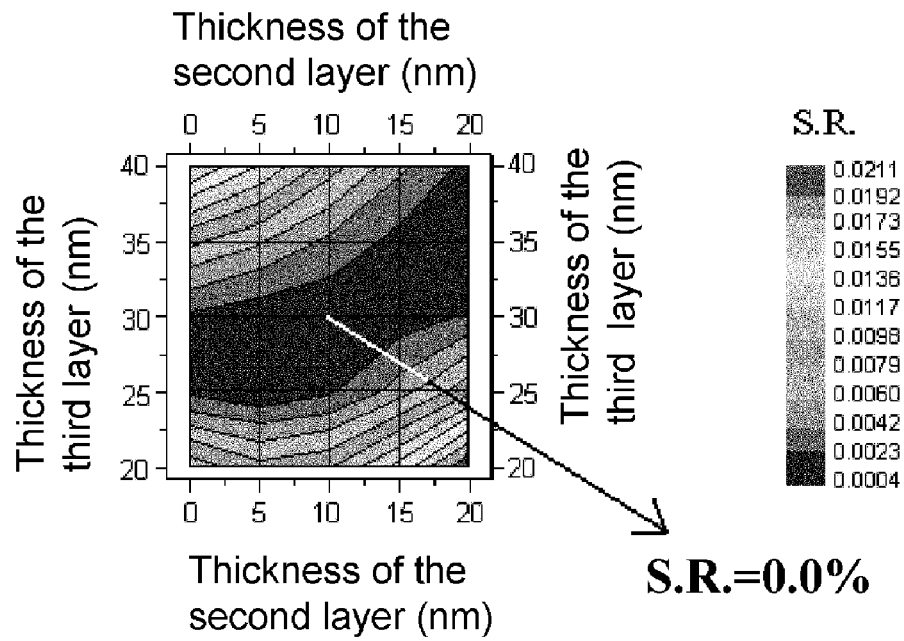
FIGS. 4A-4D are schematic chart s showing results of simulations according to the structures of Tables 1-4, respectively.
Figure 4B:
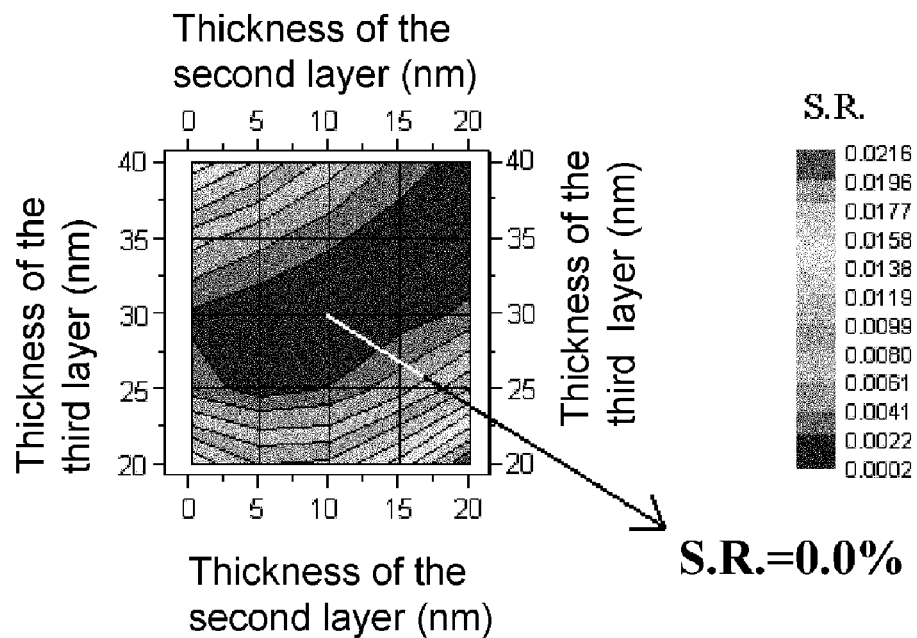
Figure 4C:
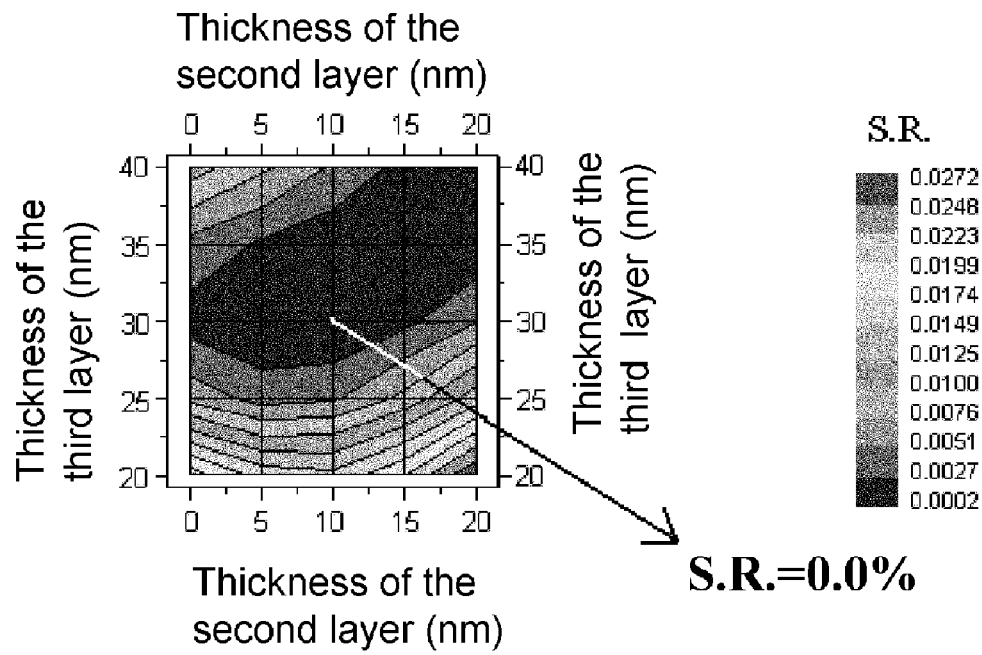
Figure 4D:
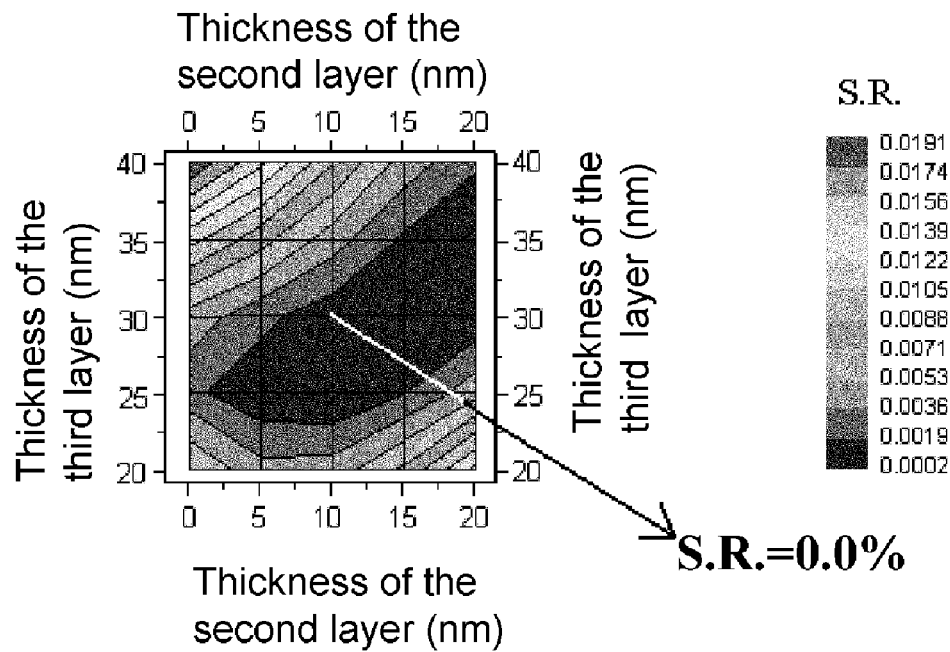

FIG. 4A is a schematic chart showing a simulation according to the structure of Table 1, wherein, S.R. represents the substrate reflectivity. In FIG. 4A, when the anti-reflection coating layer of the present invention is formed on the silicon substrate, the substrate reflectivity is substantially equal to 0. Under similar circumstances, the simulation according to the structure of Table 2 is shown in FIG. 4B, the simulation according to the structure of Table 3 is shown in FIG. 4C, and the simulation according to the structure of Table 4 is shown in FIG. 4D. As shown in FIGS. 4A-4D, regardless of the material of which the anti-reflection coating layer of the present invention is formed, the substrate reflectivity approaches 0.

Figure 5:
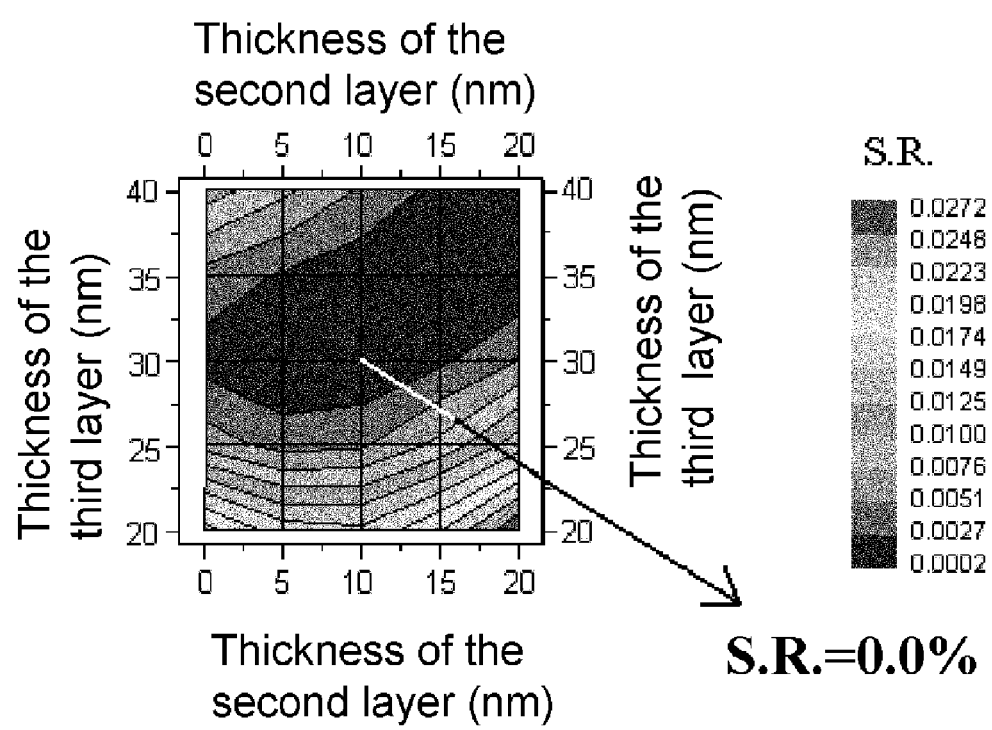
FIG. 5 is a schematic chart showing the result of a simulation according to the structure of Table 5.

The following is a simulation according to the structure of Table 5. The simulation is shown in FIG. 5. When the anti-reflection coating layer of the present invention is a silicon oxynitride layer (SiON) and its thickness is increased, the anti-reflection coating layer can serve as a hard mask (HM) and the substrate reflectivity still is substantially equal to 0.

TABLE 5

| Layer | Material | Thickness (nm) |
| --- | --- | --- |
| 1 | Photoresist layer | 300 |
| 2 | Anti-reflection coating layer (n = 2.0, k = 0.0) | 10 |
| 3 | Anti-reflection coating layer (n = 2.0, k = 0.5) | 30 |
| 4 | Anti-reflection coating layer (n = 2.0, k = 1.5) | 100 |
| 5 | Polysilicon layer (n = 1.69, k = 2.76) | 120 |
| 6 | Silicon substrate (n = 1.57, k = 3.57) | — |

According to the present invention, the n of the anti-reflection coating layer is a constant, and the k of the anti-reflection coating layer is increased in gradient toward the under layer. Unlike the n, k and thickness of the anti-reflection coating layer in the prior art, which need to be manipulated in a sophisticated manner, the present invention can easily attain a substrate reflectivity substantially equal to zero in different under layers. Moreover, the anti-reflection coating layer of the present invention can serve as a hard mask (HM).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An anti-reflection coating layer suitable to be formed between an under layer and a photoresist layer, the anti-reflection coating layer characterized in:
    a refraction (n) of the anti-reflection coating layer, wherein n is a constant; and
    an extinction coefficient (k) of the anti-reflection coating layer, wherein k is increased in gradient toward the under layer, wherein the k of the anti-reflection coating layer is increased in gradient from a top set as 0 to the under layer.

2. The anti-reflection coating layer of claim 1, wherein an increment of the value k of the anti-reflection coating layer is larger than 0 and smaller than 2.

3. The anti-reflection coating layer of claim 1, wherein a number of times the k of the anti-reflection coating layer is increased in gradient toward the under layer is at least 2.

4. The anti-reflection coating layer of claim 1, wherein each anti-reflection coating layer with different k has a different thickness.

5. The anti-reflection coating layer of claim 4, wherein a thickness of each anti-reflection coating layer with a different k is gradually increased toward the under layer.

6. The anti-reflection coating layer of claim 1, wherein a thickness of the anti-reflection coating layer is a constant.

7. The anti-reflection coating layer of claim 1, wherein the n of the anti-reflection coating layer is larger than an n of the photoresist layer.

8. The anti-reflection coating layer of claim 1, wherein the n of the anti-reflection coating layer is larger than 1.8.

9. A method of designing an anti-reflection coating layer, for substantially reducing a substrate reflectivity of the anti-reflection coating layer to zero, the method comprising:
    providing an anti-reflection coating layer formed between an under layer and a photoresist layer;
    making a refraction (n) of the anti-reflection layer a constant; and
    increasing an extinction coefficient (k) of the anti-reflection layer in gradient toward the under layer, wherein the k of the anti-reflection coating layer is increased in gradient from a top set as 0 to the under layer.

10. The method of designing an anti-reflection coating layer of claim 9, wherein an increment of the value k of the anti-reflection coating layer is larger than 0 and smaller than 2.

11. The anti-reflection coating layer of claim 9, wherein a number of times the k of the anti-reflection coating layer is increased in gradient toward the under layer is at least 2.

12. The anti-reflection coating layer of claim 9, wherein each anti-reflection coating layer with a different k has a different thickness.

13. The anti-reflection coating layer of claim 12, wherein the thickness of each and-reflection coating layer with a different k is gradually increased toward the under layer.

14. The anti-reflection coating layer of claim 9, wherein the thickness of the anti-reflection coating layer is a constant.

15. The anti-reflection coating layer of claim 9, wherein the n of the anti-reflection coating layer is larger than an n of the photoresist layer.

16. The anti-reflection coating layer of claim 9, wherein the under n of the anti-reflection coating layer is larger than 1.8.

17. The anti-reflection coating layer of claim 9, wherein the under layer comprises a silicon oxide layer, a silicon nitride layer, a polysilicon layer, a metal layer or a silicon substrate.

* * * * *